Sept. 22, 1953   E. C. RICE ET AL   2,653,291
APPARATUS FOR CONTROLLING HOISTS AND THE LIKE
Filed April 2, 1951   4 Sheets-Sheet 1
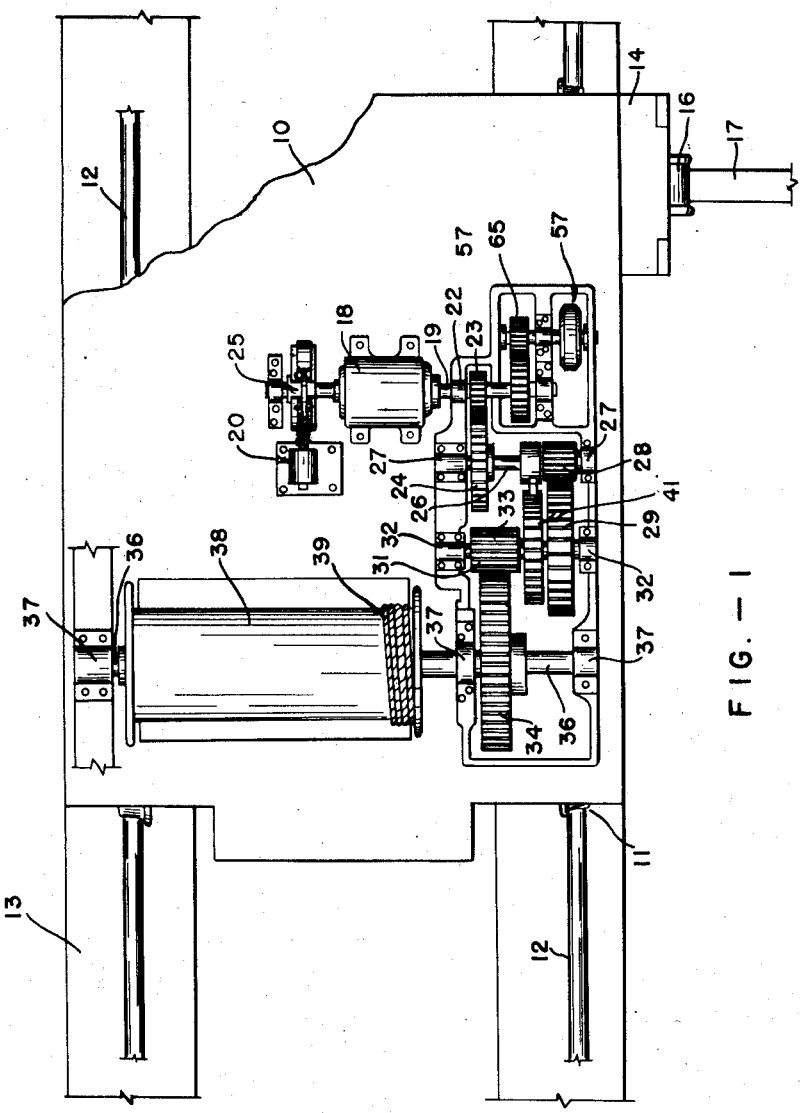
INVENTORS.
Edgar C. Rice &
George M. Rothenberger
BY
ATTORNEY

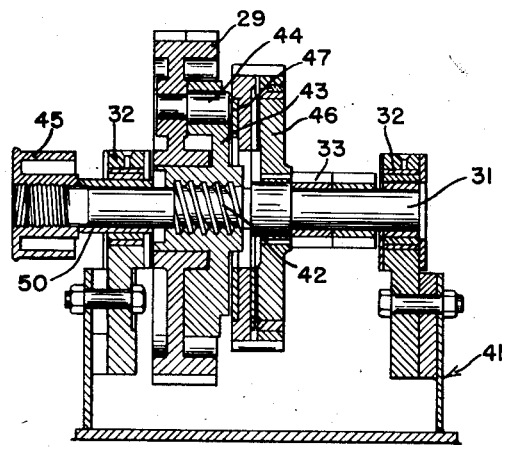
FIG.—2
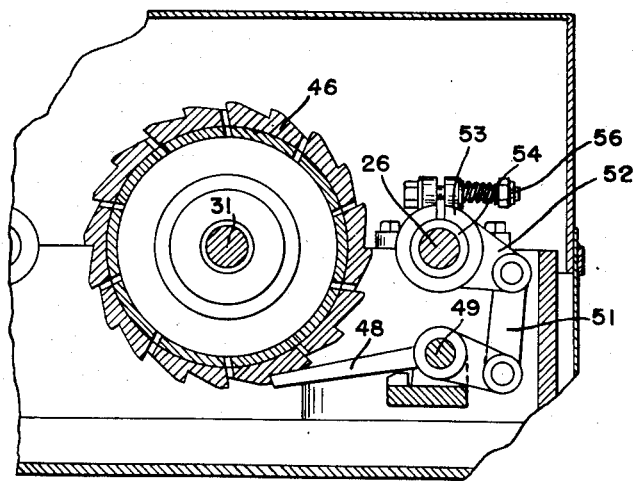
FIG.—3
INVENTORS
Edgar C. Rice &
George M. Rothenberger
BY
ATTORNEY

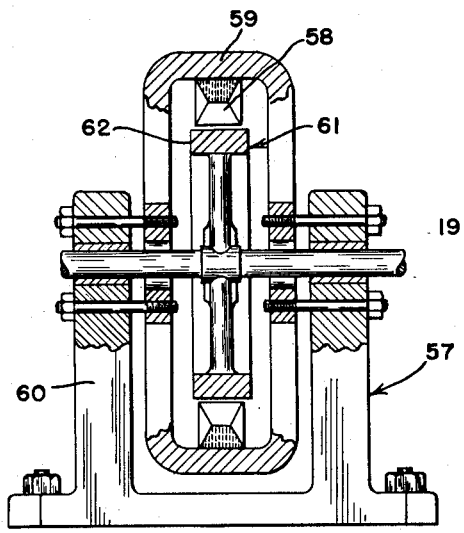
FIG.— 4
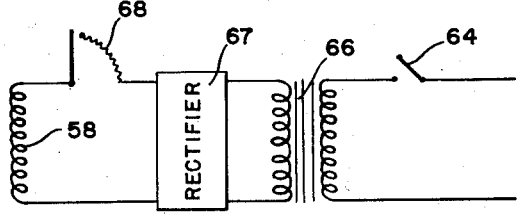
FIG.— 5
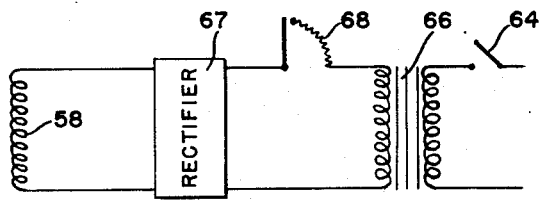
FIG.— 6
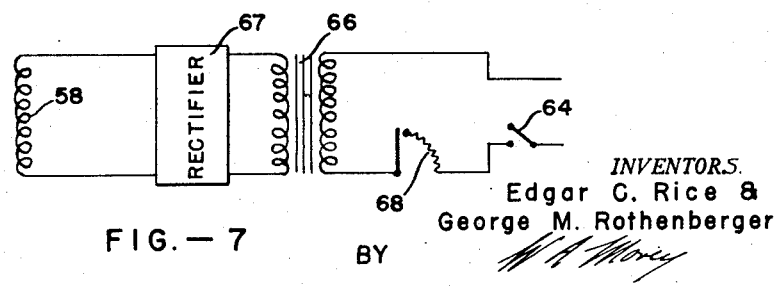
FIG.— 7
*INVENTORS.*
Edgar C. Rice &
George M. Rothenberger
BY
ATTORNEY Sept. 22, 1953     E. C. RICE ET AL     2,653,291
APPARATUS FOR CONTROLLING HOISTS AND THE LIKE
Filed April 2, 1951     4 Sheets-Sheet 4
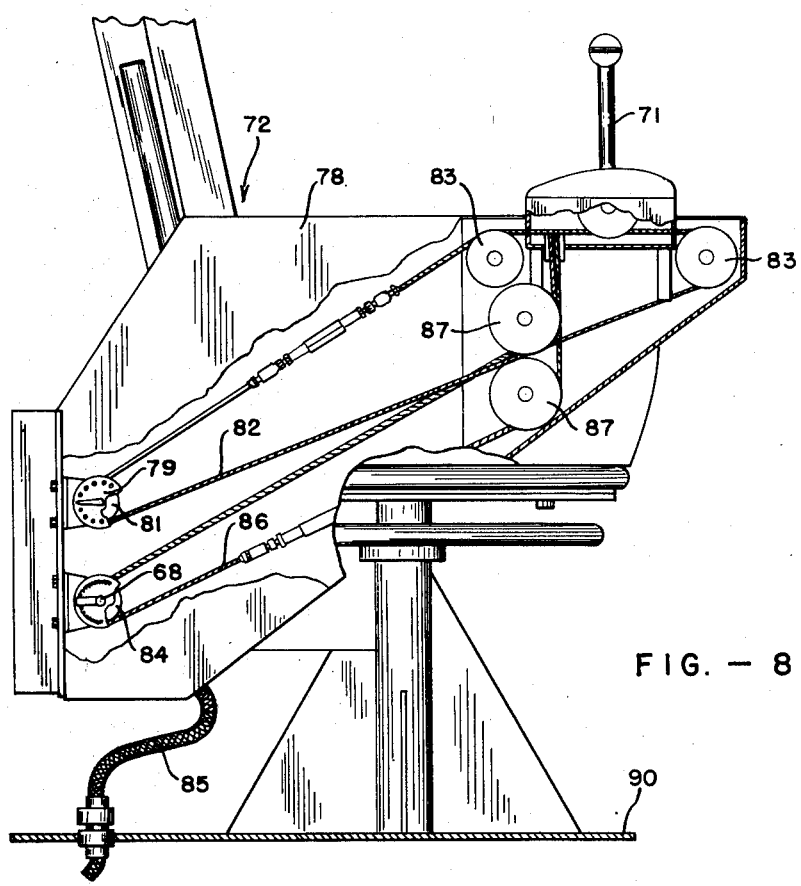
FIG. — 8
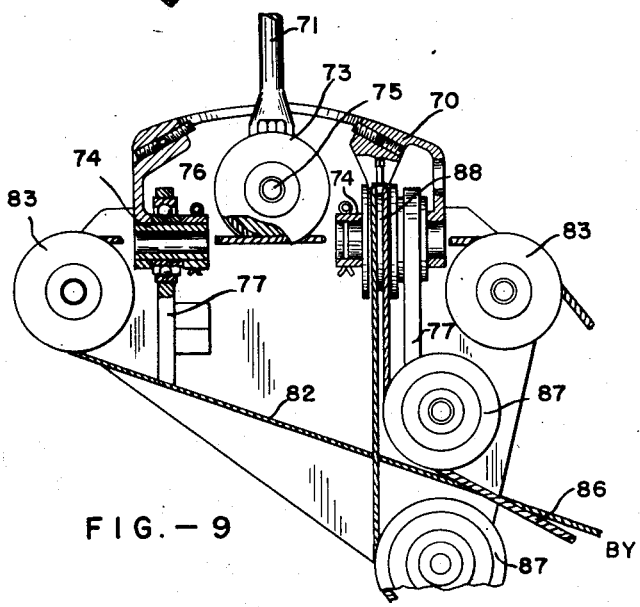
FIG. — 9
INVENTORS.
Edgar C. Rice &
George M. Rothenberger
BY
ATTORNEY Patented Sept. 22, 1953

2,653,291

UNITED STATES PATENT OFFICE 2,653,291

APPARATUS FOR CONTROLLING HOISTS AND THE LIKE

Edgar C. Rice, Blue Island, and George M. Rothenberger, Harvey, Ill., assignors to Whiting Corporation, Harvey, Ill., a corporation of Illinois Application April 2, 1951, Serial No. 218,842

8 Claims. (Cl. 318—370)

1

Our invention is directed to improved alternating current hoisting devices and the like, and refers particularly to apparatus for accurately controlling the movement of a load coupled to such apparatus.

The majority of the electric hoisting devices in the United States include a cable drum driven by an alternating current motor through a gear train. Such systems conventionally include a motor brake which is urged into actuated position by a spring or weight and released by a solenoid, the latter being actuated by energization of the motor circuit. In addition to the motor brake, a load brake, or its equivalent, is also normally provided, its function being to arrest descent of a suspended load in the event of motor brake failure.

In the operation of alternating current electric hoist mechanisms, particularly those intended for heavy duty use in overhead cranes, it has been found that the degree to which movement of the load may be controlled, particularly in a downward direction, is at times inadequate, this being frequently true even when a wound rotor alternating current motor is employed. The problem of accurately controlling the rate of load movement in such hoisting devices has been recognized for years and many devices have been proposed as solutions for this problem; but for various reasons, such as cost, complexity, difficulty of maintenance, and the like none of these proposed devices has received widespread and general acceptance.

One of the more recent proposals relating to this problem is disclosed in Wendelberg et al. 2,493,607, wherein an induction type, or eddy current brake, is connected in the gear train of a hoist driven by a wound rotor motor. Resistance in the induction brake circuit, while variable, is fixed with respect to the resistance in the motor secondary circuit, with the result, that the hoist tends to reach a constant speed for each setting of the motor control, regardless of the load imposed on the system. While this result is undoubtedly advantageous, the system fails to place within control of the operator means by which the exact speed of load movement may be closely controlled and varied under all conditions.

One of the principal objects of our invention is to provide an improved alternating current device for hoisting and the like which incorporates means variable at the will of the operator and independently of the motor circuit for accurately controlling movement of the load.

2

More specifically, it is an object of our invention to provide a hoisting device utilizing a heavy duty variable speed alternating current motor having a switch member in the motor circuit for varying motor speed and an induction brake mechanically coupled to the motor shaft, the brake being energized by a separate independent circuit including a variable resistance, both the variable resistance and the motor control switch being actuated independently by a single control lever, whereby the speed of movement of any load within the capacity of the device may be accurately controlled and varied by the operator.

Further objects of our invention will be disclosed in the course of the following description and in the drawings, in which:

Fig. 1 is a partial plan view of an overhead crane incorporating our invention;

Fig. 2 is an upright cross section through a conventional mechanical load brake;

Fig. 3 is a vertical section through a portion of the device shown in Fig. 2;

Fig. 4 is a schematic partial vertical section through a form of magnetic or eddy current brake;

Figs. 5, 6, and 7 illustrate schematically various circuits which may be employed for selectively energizing the brake illustrated in Fig. 4;

Fig. 8 is a partly broken away elevation of an arm of a crane operator's chair; and Fig. 9 is a partially sectioned elevation of a portion of the control apparatus illustrated in Fig. 8.

In brief, our invention contemplates the application of an eddy current or similar induction type brake to a hoist in such manner that the degree of energization and therefore the effect of the brake on the hoisting system can be varied at will by the operator without at the same time necessarily varying the motor circuit. Preferably, the hoisting system to which the induction type brake is applied also incorporates a conventional mechanical load brake or its equivalent so that the only braking effort required from the dynamic brake is that utilized in variably loading the alternating current motor employed for driving the hoist.

It will be understood that for any particular setting of the motor circuit, a wound rotor heavy duty alternating motor driving a hoist will tend to reach a speed directly proportionate to the load imposed. The resistance in the secondary motor circuit of such motors is conventionally varied in steps, thus changing the effective power, and therefore the speed, of the motor. To permit control of the speed of the motor between these steps, regardless of the load imposed on the system, we couple an induction type brake to the motor and provide a variable resistance in the independent brake circuit, which may be varied by the operator independently of the motor control circuit. Thus, the operator may at any time and without regard to the condition of the motor circuit artifically load the motor by increasing the brake current, thereby slowing movement of the load in either direction. This not only permits a practically infinite range of speed control within the capacity of the device, but also avoids artifically or parasitically loading the motor in situations wherein close control of load speed is not required.

In Fig. 1 we have illustrated somewhat diagrammatically an overhead trolley 10 mounted on wheels 11 for movement along rails 12, the latter being supported by bridge girders 13. End members 14 connect the bridge girders 13 and are mounted on wheels 16 for movement along rails 17. An alternating current motor 18, preferably of the wound rotor type, is mounted on the trolley 10 and is provided with a motor shaft 19, preferably projecting laterally in opposite directions. A solenoid motor brake 20 of conventional type is mounted on the trolley 10 and acts on a brake drum 25 secured to the shaft 19. The opposite end of the shaft 19 extends through bearings 22 and is keyed to a gear 23, which drives a gear 24 keyed to a shaft 26, the latter being journaled in bearings 27 carried by the trolley 10. A gear 28, keyed to the shaft 26, drives a gear 29, the latter being coupled to and supported by a shaft 31 journaled in bearings 32. A gear 33 is keyed to the shaft 31 and drives gear 34, keyed to a shaft 36, the latter being supported in bearings 37. A hoisting drum 38, secured to the shaft 36, receives a cable 39 or the like adapted for engagement with the load to be hoisted.

The driving torque applied to the gear 29 is transmitted to the shaft 31 through a mechanical load brake, generally designated 41. The particular form of mechanical load brake employed is not critical and any one of a number of conventional forms can be utilized, but in each instance the brake selected should resist movement of the motor in a lowering direction. The particular form of brake described in Coffey 1,868,792 operates in such manner and is suitable for use with our invention.

In such a brake, the shaft 31 is threaded, as indicated in 42, and rotatably supports a nut 43 having a threaded bore engaging the threads 42. The gear 29 is secured to the nut 43, as by pins 44, for rotation therewith. A ratchet wheel 46 is secured to the shaft 31 and is provided with friction facing 47 for engagement with the opposing face of the nut 43. The axial position of the nut 43 is controlled by a threaded split collar 45 mounted on the outer end of the shaft 31 and engaging a bushing 50, the latter having a collar abutting the end of the nut 43. A dog 48 is mounted for pivotal movement about a fixed shaft 49 and is pivotally coupled by a link 51 to an arm 52. An integrally formed split collar 53 is provided on the end of the arm 52 and encircles a split bushing 54 telescoped over the shaft 26. A bolt 56 extends through ears formed on the split collar 53 for clamping the bearing 54 to the shaft 26.

The components are disposed in such manner that during lifting operations shaft 26 will revolve in a counterclockwise direction, as seen in Fig. 3. The friction between the shaft 26 and the bushing 54 is sufficient to retract the dog 48 from engagement with the external teeth on the ratchet 46. The gear 29 is also rotated and drives the nut 43 axially on the threads 42 into engagement with the friction facing 47 on the ratchet wheel 46, the shaft 31 being restrained by the load. Thus, the gear 29 is firmly coupled to the shaft 31 through the ratchet wheel 46.

When the direction of movement is reversed to lower the load, the dog 48 will be moved into position to engage the teeth of the wheel 46 and the gear 29 will be driven in a direction which would separate the nut 43 from the friction facing 47 if the shaft 31 remained motionless. The load, however, also tends to drive the shaft 31 in a lowering direction, usually at a speed considerably greater than the speed of the hoist, with the result that the nut 43 and the friction facing 47 are held in more or less continual frictional engagement. The net effect of this action is to apply a braking effort to the hoist tending to oppose rotation of the motor 18 in a downward direction and is in some instances sufficient to require the application of about one-third of the current required to hoist the same load.

In some instances, particularly in smaller hoisting devices, the particular form of load brake described is eliminated and the gear train modified to utilize worm gears having a pitch which prevents the transmission of torque from the load to the motor, thereby providing in effect a load brake. The inefficiency of this type of gearing, however, also develops an artificial load on the motor and thus creates approximately the same net effect.

In devices of the type described, the secondary motor circuit is conventionally controlled by a step switch, which increases or decreases in stepwise fashion the resistance of the circuit and thus permits a stepwise control of motor speed. In many instances close control of load movement can be effected by a practice known as inching, which involves rapidly switching the motor on and off by proper movement of the step switch. This form of control is adequate for many conditions, but obviously is not satisfactory where very accurate control is required.

To obtain such control, we couple an induction type brake, generally designated 57, to the shaft 19. By use of the term "induction type brake" we mean to include brakes such as a dynamo where the generated current is dissipated through a suitable resistance or a more conventional and practical eddy current brake of the type diagrammatically illustrated in Fig. 4, wherein a torroidal field coil 58 is employed to generate a magnetic field continuously cut by a rotor having a rim 62. Movement of the rim 62 through the field generates eddy currents in the rim, thus absorbing the energy and creating a braking effect proportionate to the speed of rotation and to the intensity of the field. Usually the coil 58 is secured within a housing 59 having ventilating openings and supported on a suitable standard 60 adapted for attachment to the trolley 10. The rim 62 constitutes the periphery of a rotor 61, which we couple, as by gears 65, to the shaft 19 of the motor 18. Thus, it may be seen that the resistance to rotation of the shaft 19 generated by the brake 47 will be proportionate to the value of the current passing through the coil 58. Since the power current available at the trolley 10 is alternating current, it is passed through a disconnect switch 64 into the primary winding of a transformer 66. The secondary winding of this transformer may be connected to a suitable rectifier 67, the output of which is connected as shown in Fig. 5 to the coil 58. A variable resistance 68 is interposed between the rectifier 67 and the coil 58 to vary the value of the current passing through the coil 58. If desired, as shown in Figs. 6 and 7, the variable resistance 68 may be interposed between the transformer 66 and the rectifier 67, or between the transformer 66 and the source of alternating current. In most instances the circuit illustrated in Fig. 5 is considered preferable. The gears 65 are arranged to increase the speed of the rotor 61 with respect to the speed of the motor 18 and should in most instances be of high ratio, since the effectiveness of the induction type brake is greater at higher speeds.

The energy generated in the rotor 61 and the rim 62 may be employed for generating eddy currents in the rim 62, in which instance a material of appreciable resistance, such as iron is employed, or may be fed back in conventional manner to the field coil 58.

Conventional overhead cranes employ a number of motor controls, each of which must be moved independently by the operator. This usually requires use of both the operator's hands when the crane is in operation, one hand normally being employed for control of the hoist and the other hand being employed for control of bridge and/or trolley motors. To permit effective utilization of the induction brake 57, it is therefore highly desirable that the movable control member which controls the circuit to the hoisting motor also controls independently the induction brake circuit. A device suitable for such purpose is illustrated in Figs. 8 and 9, as applied to a swivel chair, although obviously if desired the same device can be mounted on a fixed support in an operator's cab.

A control lever 71 is mounted preferably on the right hand arm of an operator's chair 72 for movement in an upright plane towards and away from the operator and also in a plane transverse to the operator. This is accomplished by pivoting the lever 71 to a transverse shaft 75, the lever also being secured to a sheave 73 concentric with the shaft 75. The shaft 75 extends through a housing 70 having opposed internal aligned tubular members 74 journaled in bearings 76, the latter being mounted on boss 77 secured to an arm 78 of the chair 72. A motor control step switch 79 is also secured to the chair arm 78 and includes a sheave 81 over which a cable 82 is trained. Idler sheaves 83 guide the cable through the aligned openings of the tubular members 74 and into the housing 70, where it is trained around the sheave 73. Thus, it will be seen that movement of the control lever 71 towards or away from the operator will drive the step switch 79 in a corresponding direction. Contacts on the step switch are arranged in such manner that when the control lever 71 is in upright position the motor is disconnected. Moving the control lever forward drives the hoisting mechanism in a lowering direction, the speed being proportional to the angular forward displacement of the control lever 71. Rearward movement of the control lever 71 similarly drives the hoist in a hoisting direction.

The variable resistance 58 is also mounted on the arm 78 of the chair 72 and includes a sheave 84 over which a cable 86 is trained. The cable 86 passes over idler sheaves 87 and around a sheave 88, the latter being secured to one of the tubular members 74 in the housing 70, in such manner that transverse movement of the control lever 71 drives the variable resistance. The motor control circuit, which includes the step switch 79 and the independent induction brake control circuit, which includes the variable resistance 68, are completed through a flexible cable 85 extending from the chair 72 to the floor 90 of the cab.

It is desirable to arrange the resistance element or elements of the variable resistance 68 in such manner that the circuit to the induction brake is open when the control lever 71 is in upright position. Movement of the lever 71 to the right completes the brake circuit and upon further movement to the right gradually reduces the resistance in the circuit and increases the current flowing to the field coil 58 of the brake 57. Since a similar control mechanism may be used on the other chair arm for controlling bridge and trolley motors, it may be seen that an operator may at all times keep his hands on the two control levers and thereby control three motors and the brake.

In ordinary operation, the lever 71 is not moved transversely, thus allowing the induction brake to remain inactive. Even in ordinary lowering operations the parasitic resistance generated by the load brake pre-loads the motor sufficiently for most purposes. If, however, it is desired to raise or lower a load very slowly, the lever 71 may be moved transversely either before or after the lever is moved towards or away from the operator, thus energizing the coil of the brake. The degree to which the brake loads the motor is thus fully within the control of the operator and completely independent of the motor circuit, which permits accurate control of the speed of load movement regardless of the degree of energization of the motor.

The effect of the brake 57 is marked even at relatively low motor speeds because the speed of the brake rotor 61 is greater than the speed of the motor shaft 19.

Since three brakes, rather than two, are employed, it is obvious that a high order of safety is obtained. In addition, since the induction type brake is not in continuous use, elaborate provision for brake cooling is not required. In addition, it is not necessary for the operator to move his hands from one control to another during operation.

We claim:

1. In hoisting apparatus of the type utilizing a reversible alternating current motor having a shaft coupled to a gear train which terminates in a rotatable member, a flexible load-engaging member secured to the rotatable member for raising and lowering a load and a motor control switch interconnecting the motor with an alternating current source, the improvement which includes an electrically controlled motor brake in the motor circuit an induction brake mechanically coupled to the motor shaft and having a field coil, a field coil energizing circuit including conductors for transmitting current from said alternating current source to the coil and a rectifier and a variable resistance in said circuit for selectively varying the degree of field coil energization, said variable resistance being adjustable independently of the motor control switch.

2. In hoisting apparatus of the type utilizing a reversible alternating current motor having a shaft coupled to a gear train which terminates in a rotatable member, a flexible load-engaging member secured to the rotatable member for raising and lowering a load and a motor control switch interconnecting the motor with an alternating current source, the improvement which includes an electrically controlled motor brake in the motor circuit an induction brake mechanically coupled to the motor shaft and having a field coil, a field coil energizing circuit connected to the said alternating current source, said circuit including a rectifier for delivering direct current to a field coil and a variable resistance, and a control member coupled to the motor control switch and to the variable resistance, said control member being mounted for movement in a first plane for actuating the motor control switch and independently in a second plane for actuating the said variable resistance.

3. Apparatus for hoisting and the like comprising a variable speed alternating current motor having a shaft, a gear train driven by the motor shaft, means for coupling a load to the gear train, a motor control switch for varying the speed of said motor, a spring loaded solenoid release brake on the motor shaft connected to the motor circuit a second brake for variably resisting rotation of the motor shaft in either direction, and means for applying the second brake including a coil for generating a magnetic field and a variable resistance for varying the flow of current through the coil and thereby varying the degree of brake application, said variable resistance being movable independently of motor switch.

4. Apparatus for hoisting and the like comprising a variable speed alternating current motor having a shaft, a gear train driven by the motor shaft, means for coupling a load to the gear train, a motor control switch for varying the speed of the motor, a mechanical load brake in the gear train of the type resisting rotation of the motor in one direction and means for variably supplementing the said resistance of the load brake, said means including an induction type brake coupled to the motor shaft, a brake energizing circuit, and means for varying the current flowing to the induction brake, said last-mentioned means being actuatable independently of the motor control switch.

5. Apparatus for hoisting and the like comprising a gear train, means for coupling the gear train to a load, a wound rotor alternating current motor having a shaft for driving the gear train, a motor control circuit connected to an alternating current source, a motor control step switch in the motor control circuit, a motor brake coupled to the motor shaft, a mechanical load brake in the gear train, said mechanical load brake being of the type resisting rotation of the motor in a lowering direction, an eddy current brake having a field coil and a rotor, said rotor being coupled with the motor shaft, a field coil energizing circuit connected to the alternating current source and independent of the motor control circuit, said field coil circuit including a rectifier for delivering direct current to the field coil and a variable resistance in said circuit between the field coil and the rectifier, a housing supported for movement about a first axis and coupled to the said variable resistance, a lever for rocking the housing about said first axis, and a pin in the housing transverse to the said first axis pivotally supporting the lever, said lever being coupled to the motor control switch.

6. Apparatus for hoisting and the like comprising a gear train, means for coupling the gear train to a load, a wound rotor alternating current motor having a shaft for driving the gear train, a motor control circuit connected to an alternating current source, a current control member in the motor control circuit, a motor brake coupled to the motor shaft, a mechanical load brake in the gear train, said mechanical load brake being of the type resisting rotation of the motor in a lowering direction, an eddy current brake having a field coil and a rotor, said rotor being coupled with the motor shaft, a field coil energizing circuit connected to the alternating current source and independent of the motor control circuit, said field coil circuit including a rectifier for delivering direct current to the field coil and a second current control member in the field coil circuit between the rectifier and the field coil, a first member mounted for rocking movement about a first axis and coupled to one of said current control members, a second member for rocking the said first member about the said first axis, and means carried by the first member pivotally supporting the said second member for movement about an axis transverse to the first axis, said second member being coupled to the other of the current control members.

7. In hoisting apparatus of the type including a reversible speed alternating current motor having a shaft, a motor brake releasable by energization of the motor circuit and an induction type brake coupled to the shaft, said brake having a field coil, the combination therewith of a first adjustable control member for varying the flow of current to the motor, a second adjustable control member for varying the flow of current to the field coil of the brake, a first member mounted for rocking movement about a first axis and coupled to one of the control members, and a second member pivotally secured to the said first member for movement about an axis transverse to the said first axis, the said second member being coupled to the other of the control members.

8. In hoisting apparatus of the type utilizing a reversible alternating current motor having a shaft coupled to a gear train which terminates in a rotatable member, a flexible load-engaging member secured to the rotatable member for raising and lowering a load, and a motor control switch interconnecting the motor with an alternating current source, the improvement which includes an induction brake having a rotor and a field coil, mechanical means coupling the rotor to the motor shaft for increasing the relative speed of the rotor, a field coil energizing circuit including conductors for transmitting current from said alternating current source to the coil, and a rectifier and a variable resistance in said circuit, said variable resistance being connected for carrying the effective current delivered to the field coil and adjustable independently of the motor control switch.

EDGAR C. RICE.
GEORGE M. ROTHENBERGER.

References Cited in the file of this patent

UNITED STATES PATENTS

| Number | Name | Date |
|---|---|---|
| 1,755,079 | Schiebeler | Apr. 15, 1930 |
| 2,074,126 | Mead | Mar. 16, 1937 |
| 2,493,607 | Wendelburg | Jan. 3, 1950 |